(12) United States Patent
Tomas

(10) Patent No.: US 11,549,711 B1
(45) Date of Patent: Jan. 10, 2023

(54) SYSTEM FOR AGGREGATION AND PRIORITIZATION OF DIAGNOSTIC DATA FOR THE PURPOSE OF MECHANICAL SYSTEM TUNING

(71) Applicant: Alexander Tomas, Alphretta, GA (US)

(72) Inventor: Alexander Tomas, Alphretta, GA (US)

( * ) Notice: Subject to any disclaimer, the term of this patent is extended or adjusted under 35 U.S.C. 154(b) by 0 days.

(21) Appl. No.: 17/657,953

(22) Filed: Apr. 5, 2022

Related U.S. Application Data

(60) Provisional application No. 63/292,647, filed on Dec. 22, 2021.

(51) Int. Cl.
| | |
|---|---|
| *F24F 11/523* | (2018.01) |
| *F24F 11/38* | (2018.01) |
| *G09G 5/02* | (2006.01) |
| *G06F 3/04817* | (2022.01) |
| *G09G 5/37* | (2006.01) |
| *F24F 11/64* | (2018.01) |

(52) U.S. Cl.
CPC ............ *F24F 11/523* (2018.01); *F24F 11/38* (2018.01); *F24F 11/64* (2018.01); *G06F 3/04817* (2013.01); *G09G 5/024* (2013.01); *G09G 5/37* (2013.01)

(58) Field of Classification Search
CPC ........ F24F 11/38; F24F 11/64; G06F 3/04817
See application file for complete search history.

(56) References Cited

U.S. PATENT DOCUMENTS

| | | | | |
|---|---|---|---|---|
| 10,619,882 | B2* | 4/2020 | Chatterjee | G05B 15/02 |
| 10,648,692 | B2* | 5/2020 | Chatterjee | F24F 11/64 |
| 11,182,047 | B2* | 11/2021 | Nayak | G06F 3/0481 |
| 2014/0074730 | A1* | 3/2014 | Arensmeier | F24F 11/49 705/305 |
| 2016/0131388 | A1* | 5/2016 | Eiynk | G05B 15/02 707/728 |
| 2016/0217674 | A1* | 7/2016 | Stewart | G05B 15/02 |
| 2017/0242411 | A1* | 8/2017 | Papadopoulos | F24F 11/30 |
| 2017/0292725 | A1* | 10/2017 | Conley | F24F 11/52 |
| 2017/0356663 | A1* | 12/2017 | Couperthwaite | F28F 13/06 |
| 2019/0034309 | A1* | 1/2019 | Nayak | G06F 3/04842 |
| 2019/0186766 | A1* | 6/2019 | Maslekar | F24F 11/61 |

(Continued)

*Primary Examiner* — Mohammad Ali
*Assistant Examiner* — Vincent W Chang
(74) *Attorney, Agent, or Firm* — Larson & Larson; Justin P. Miller; Frank Liebenow

(57) ABSTRACT

The system for aggregation and prioritization of diagnostic data for the purpose of mechanical system tuning allows the user, or technician, to quickly tune a complex mechanical system, such as a HVAC system. Tuning is assisted by rendering alert, system performance, and subsystem performance using a consistent visual tuner as a replacement for traditional mechanical gauges. Diagnostic data is collected by one or more data trackers and sensors installed on mechanical components within the HVAC unit. Data collected includes temperatures, flow, amperage consumption, refrigerant pressure, and related metrics. When the user opens the interface for the mechanical system tuner, the user is first prompted to select a location and a time period. The system then reviews its previously collected data, sorting and processing for the location and time period selected. The user is then presented with multiple performance measurements rendered in a consistent graphical, color-coded format.

11 Claims, 20 Drawing Sheets

(56) References Cited

U.S. PATENT DOCUMENTS

| | | | |
|---|---|---|---|
| 2021/0231330 A1* | 7/2021 | Stephens | F24F 11/38 |
| 2021/0248618 A1* | 8/2021 | Ionescu | G06F 3/04847 |
| 2021/0310679 A1* | 10/2021 | Toyama | F24F 11/38 |

* cited by examiner

| HVAC | |
|---|---|
| ⩔ Robert Tomas DO (No address specified) | SCAN ▽ 12/27/2021  12/30/2021 |

108 {
- \+ GOODMAN - FRONT     👍 OK ❄ 116%
- \+ GOODMAN - MEDSPA    👍 OK ❄ 99%
- \+ GOODMAN - OR        ⚠1 ⚠2 ❄ 85%
- \+ TRANE - OR          ⚠3 ❄ 111%

SYSTEM FOR AGGREGATION AND PRIORITIZATION OF DIAGNOSTIC DATA FOR THE PURPOSE OF MECHANICAL SYSTEM TUNING

CROSS-REFERENCE TO RELATED APPLICATION

This application claims priority to U.S. Pat. App. Ser. No. 63/292,647, filed Dec. 22, 2021, titled Mechanical System Smart Tuner.

FIELD

This invention relates to the field of mechanical system diagnosis and more particularly to a system for interpreting, prioritizing, and presenting mechanical system diagnostic data.

BACKGROUND

Mechanical systems with interdependent components, including Heating, Ventilation, and Air Conditioning (HVAC) systems, require periodic maintenance. HVAC systems include many moving parts and interacting systems. As a result, adjustments and repair are required from time to time to compensate for parts wearing down, breaking, or initial miscalibration.

While the collection of diagnostic data is straightforward, it is the processing and prioritization that is difficult. The current methodology for diagnosing and correcting HVAC systems relies heavily on the skill of the technician. Currently, a technician must locate issues by walking through checklists and troubleshooting a system step-by-step. When the technician is skilled, experienced, and diligent, this method is very effective. But when a technician is rushed, or lacks skill and or experience, the resulting troubleshooting is incomplete and imperfect.

What is needed is an automated system for tuning and diagnosing complex mechanical systems that allows a technician to quickly review a large complex system and quickly diagnose issues.

SUMMARY

The system for aggregation and prioritization of mechanical system diagnostic data for the purpose of tuning a mechanical system allows the user, or technician, to quickly tune a complex mechanical system such as a HVAC system.

Diagnostic data is collected by one or more data trackers and sensors installed on mechanical components within the HVAC unit.

Data collected includes temperatures, flow, amperage consumption, refrigerant pressure, and related metrics.

This data is passed to the server at predetermined intervals, for example 15 second intervals. On the server the data is processed to prepare a collection of calculated values, including: temperature change across a unit; superheat; subcool; measured amperage versus manufacturers recommended amperage; refrigerant pressure versus recommended refrigerant pressure; runtime; cycle time; and so forth.

By collecting and pre-processing the data, the application provides the user with data that is ready for evaluation. This expedites the diagnostic process The user can also review historical data associated with systems that are no longer physically present or operational.

The data processing can take multiple forms.

Certain calculations, or processing, is useful for monitoring component and system performance.

For example, certain values are calculated on a component level. Such calculations can include averages, minimums, and maximums of measured values. For example, the average amperage drawn by the blower, the minimum amperage, and the maximum amperage.

Runtime values are also optionally calculated. For example, the time from the powering on to the powering off of the blower. Runtime can then be compared across components. For example, the runtime of the compressor as compared to the runtime of the blower.

Additional useful metrics include monitoring of the cycling of the system. For example, a cooling cycle versus a heating cycle. Displaying this information can help the technician diagnose problems, such as overly frequent system switching between heating and cooling.

Determining whether the system is in a heating cycle or a cooling cycle also informs which values are appropriate. For example, a normal air temperature at the condenser inlet will vary depending on whether the system is cooling or heating.

Other calculations are made to detect mechanical issues.

For example, identifying extreme data values within a cycle. For example, fluctuations in the blower motor's amperage consumption, or very high or very low refrigerant pressure or temperature measurements.

The above calculations are then used to determine and render the performance data that forms the basis of the visual tuner, the visual tuner being the collection of graphics and indicators that quickly allows the user to identify whether a particular component, or piece of equipment, is operating properly.

Other metrics can be established to associate color conditions with performance values. For example, measured average amperage consumption of the blower that results in 110% calculation may create a red status indication. In contrast, the refrigerant system may be more tolerant of higher percentage values before being as concerning to the technician, thus refrigerant conditions may need to reach 140% of ideal before a red status indication is presented.

With this processing performed, either in advance of a call for data, or after the user has specified a system and time period, the system is ready to present the data to the technician in an easy-to-understand format.

When the user opens the interface for the mechanical system tuner, the user is first prompted to select a location and a time period.

The system then reviews its previously collected data, sorting and processing for the location and time period selected.

The user is then presented with multiple performance measurements rendered in a graphical, color-coded format.

Diagnostic data is rendered in a manner that includes preset range values as well as a measured value. Preset range values can be values set by a manufacturer, or values known in the industry as standard operational parameters. For example, in an air conditioning system the air should decrease in temperature by 20 degrees Fahrenheit after passing across the evaporator. These data sets can be referred to as component data sets, wherein each component data set of the plurality of component data sets indicates performance of a respective component within a HVAC system.

This equipment, or component, data is divided into categories within the system's database. This allows the system to correlate the appropriate data for a given component with the component itself when making a comparison to determine whether the component is operating appropriately.

Preset range values can include high or low temperatures, high or low subcooling, high or low superheat, high or low amperage, as well as particular ventilation conditions.

When the system is operating within the range set by the preset values, an icon, for example a thumbs up sign, optionally in combination with color coding, for example green, indicates to the user in a readily-understandable manner that the particular component is operating properly. The result is that a technician is able to quickly identify whether the system is operating within its preferred range without requiring the technician to recall the ideal operating conditions.

Data are presented in a visual format that is intuitive to the user. For example, a dial or a slider placed along a range of values, the indicator of the dial or slider showing the user visually where the component is operating along the preset range.

The main page of the interface is referred to as the tuner page.

The primary graphic on the first tuner page presents the performance value determined by the technician to be most applicable. For example, in the HVAC industry the temperature change across evaporator is often the first metric review to determine system performance. Often in combination with air flow measurements. This graphic is primary because most HVAC problems can be diagnosed by a review of the air flow and outlet temperature.

To simplify this process of diagnosis, the temperature is preferably displayed on ½ circle graph moving from a left-hand side of too hot with warm coloration, red, the right-hand side of too cold with cool coloration, light blue, and a central section of ideal operation represented in green. Whether the lower value is on the left side of the dial, or the right side of the dial, will vary depending on the particular piece of equipment being monitored.

Other methods of displaying, or formatting, the tuner graphic are anticipated. For example, using a bar chart, a full circle, or other visual indications.

The tuner page features a collection of predefined icons that represent system components or particular measurements. For example, airflow, bypass operation, blower operation, fan operation, coil condition, compressor condition, and refrigerant condition.

Finally at the bottom is an area for alert messages. For example, system conditions that exist outside of operational limits. For example, high superheat for refrigeration, high amperage draw for motors, and so forth.

By presenting the user with this information on the front page the user can quickly determine which system metrics are operating within suggested limits and which are operating improperly.

The user can then move between the different subsystems by tapping the relevant icon. The icons are intentionally placed in an order from most likely to be problematic to least likely. The result is that as the user moves from left to right walking through the systems, the user is likely to discover any problems with the system in the earlier of icons. This limits the time the user needs to interface with the device and increases the likelihood that the user will locate system issues quickly. This also focuses the less experienced user on the portions of the system that are most likely to be problematic.

The order of issues is air flow, bypass operation, blower operation, fan operation, coil conditions, compressor operation, and refrigerant conditions.

As each icon is tapped, the system information is summarized and presented in a common format. For example, critical measurements presented in a table below a graphical representation of an ideal scale for operation, with an arrow to indicate present conditions.

Presenting data in the unified format even when the units or type of information differ allows the technician to quickly identify problems across areas without requiring a skilled understanding of the difference between, for example, measurements/units of current and airflow.

When appropriate, alerts are displayed at the bottom. The alert text preferably includes an explanation of the seriousness of the alert as well as suggested maintenance tasks.

For users who desire additional information, along the top of the interface is a collection of tabs. The system starts at the diagnostics tab, which has been discussed above. Additional tabs include: use, graphs, and online status.

The use tab displays data associated with the given operational characteristic charted across the time period. For example, a chart of how many minutes the system operates in a given hour, separated by each day.

The graphs tab displays an overlay of multiple data points such as supply and return temperature, allowing an experienced user to have a more nuanced understanding of the operation of the system.

The online status tab shows the system as it exists currently.

Sophisticated users are able to dive even further with the plotting of multiple variables on a single chart including temperature, amperage, airflow, and so forth.

BRIEF DESCRIPTION OF THE DRAWINGS

The invention can be best understood by those having ordinary skill in the art by reference to the following detailed description when considered in conjunction with the accompanying drawings in which:

FIG. 6 illustrates a system selection screen of the system for HVAC diagnosis and optimization.

DETAILED DESCRIPTION

Figure 1:
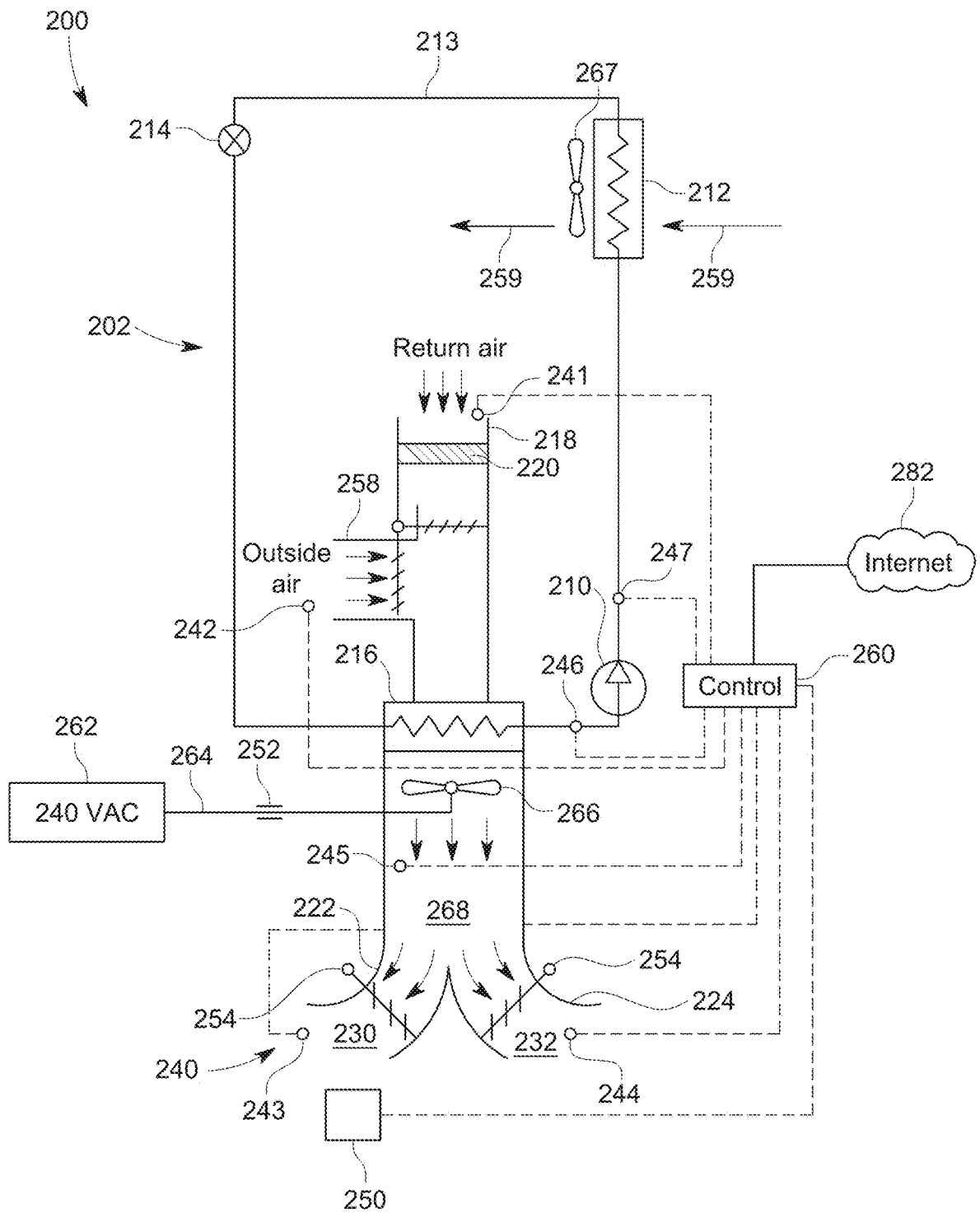
FIG. 1 illustrates a schematic view of a typical heating ventilation and air conditioning system.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view is shown of a typical heating ventilation and air conditioning system that would be used with the system for HVAC diagnosis and optimization.

The HVAC system 200 shown is a refrigerant system 202. Other types of systems, for example a boiler system or an ice water system could correspondingly be used with the system for HVAC diagnosis and optimization.

The refrigerant system 202 includes a compressor 210 that pressurizes refrigerant within a refrigerant line 213. The refrigerant then passes through the condenser 212, where the heat is passed to ambient air 259.

The refrigerant then flows through the expansion device 214 where it drops pressure and temperature. The refrigerant then passes through the evaporator 216, where the condenser fan 267 air blows across the evaporator 216, cooling the air. The refrigerant then continues to cycle through the system in the same manner.

The common air supply duct 218 takes in air from the conditioned space. An optional filter 220 within the common supply duct 218 removes particulates and other contaminants from the air.

After passing across the evaporator 216, the cooled, or conditioned air 268 is moved through and by the blower 266, the air passes into one or more ducts here shown as the first discharge duct 222 into the first zone 230 and the second discharge duct 224, into the second zone 232.

Outside air is optionally introduced via the fresh air duct 258.

Dampers 254 allow for control of the air flow into the first zone 230 and second zone 232.

Temperature sensors 240 are optionally placed in multiple locations, including, TS return 241, TS outside 242, TS zone one 243, TS zone two 244, and TS supply 245.

The pressure and temperature of the refrigerant is optionally monitored via a refrigerant upstream sensor 246 placed upstream of the compressor 210, and a refrigerant downstream sensor 247 placed downstream of the compressor 210.

One or more humidity sensors 250 are placed within the first zone 230 and the second zone 232.

One or more current sensors 252 measure the current consumption of the associated pieces of equipment, for example placed on the power wiring 264 between the AC power source 262 and blower 266.

This multitude of sensors is ideally connected to a local control device 260, which is in turn connected to the Internet 282.

Figure 2:
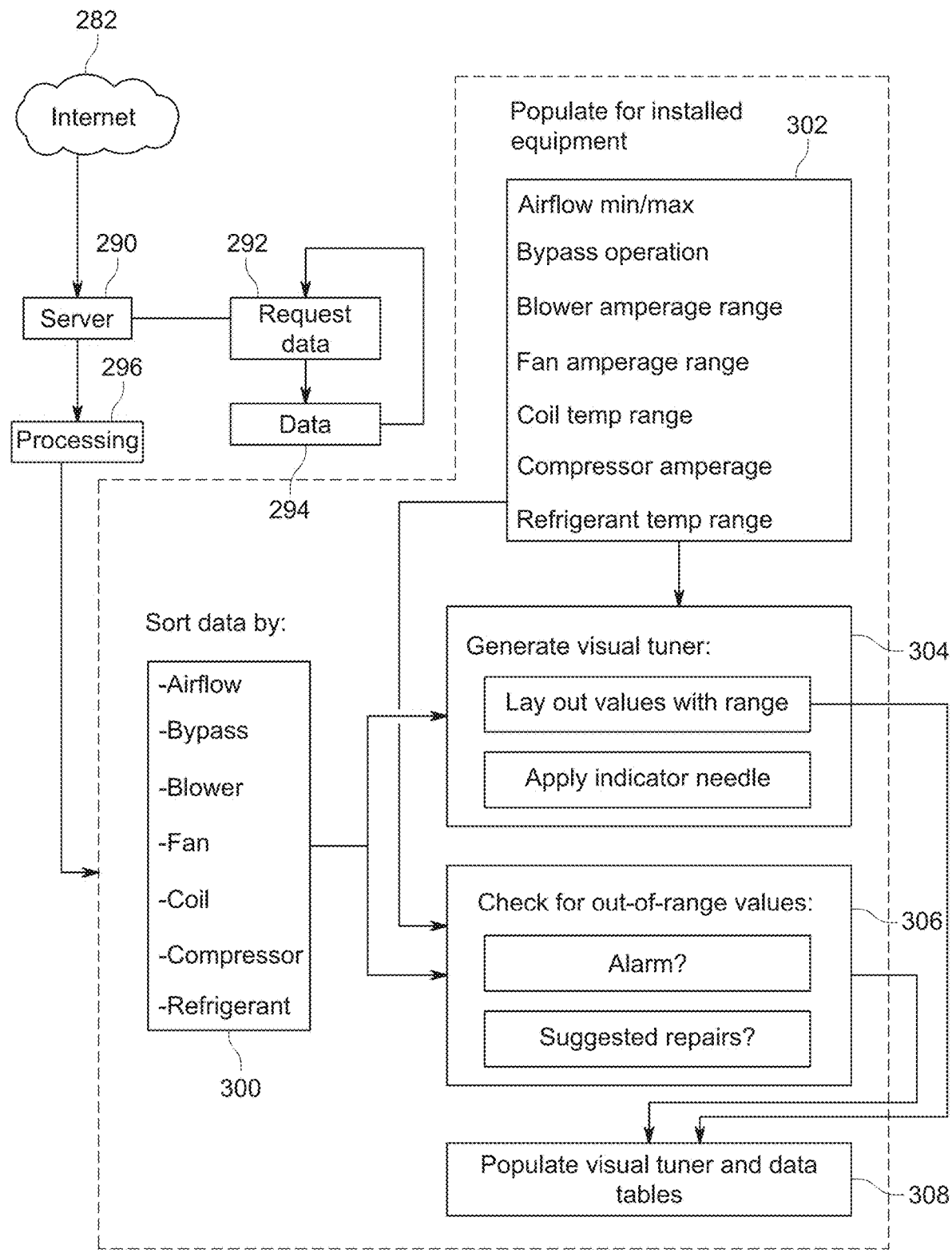
FIG. 2 illustrates a flow chart of the operation of the system for HVAC diagnosis and optimization.

Referring to FIG. 2, a flow chart of the operation of the system for HVAC diagnosis and optimization is shown.

The accumulated system data is transferred via the Internet 282 to a server 290.

The server is likely a physical computer, likely in a remote location. For example, the combination of a processor, memory, storage, and networking hardware. Alternatively, the server is a virtual machine running inside of a computer, for example, in the cloud.

On a predetermined interval, the server executes the step of requesting data 292, and then storing data 294. This way the data associated with the HVAC system is available when called for by the user, even if the system is not available. Additionally, the HVAC system does not require local data storage. This simplifies the process of setting up the HVAC monitoring and lowers the cost.

The server 290 then executes a processing step 296. In some embodiments, some or all of the processing is executed before the user requests the data. This is also referred to as preprocessing. Preprocessing can speed up the apparent response time of the server when the user asks for system data.

Alternatively, the server 290 can wait to execute processing 296 until a specific data set is requested by the user, the specific data set bound by the relevant HVAC system of interest and a specified time range.

Processing 296 includes the following primary steps:

The first step is sorting 300. This is where the incoming data is separated by the part of the system diagnostic with which the data is associated. For example, whether the data is part of the airflow system, bypass system, blower operation, fan operation, coil conditions, compressor operation, or refrigerant conditions.

Of equal priority with sorting 300, is populating data for installed equipment 302, or manufacturer data. This is the information the manufacturer states representing the ideal, or safe, operating conditions of each piece of equipment. For example, the preferred operating amperage of the compressor, as well as uppermost and lowermost operating amperages. By populating this data and correlating it with actual system operation, the technician can quickly see which components are operating within specifications, and which are operating outside.

As an alternative to the use of manufacturer data, the system can use other sources to populate the data for installed equipment 302, such as common practice industry values. For example, certain industry standards apply across systems and equipment. For example, in an air conditioning system, air temperature should decrease across the evaporator by approximately 20 degrees Fahrenheit. The use of such general guidelines, or general principles, allows the system to operate across equipment brands, including when relevant manufacturer data is unavailable.

Next, the sorted HVAC system data and the equipment data are combined to generate the visual tuner 304.

To generate the visual tuner 304, equipment/manufacturer data is correlated, or matched, with component data, to allow the system to recognize which equipment data is associated with existing, or installed, components.

Generation of the visual tuner includes laying out manufacturer values to create the bounds of the indicator associated with the visual tuner. The indicator needle is then applied, indicating system conditions for the time period measured.

Finally, processing checks for out-of-range values 306. Out of range values constitute error values, or measured HVAC system component conditions that are outside of equipment/manufacturer specifications. Out of range values 306 will generally trigger an alarm. The system also can include a database of suggested repair advice, or remedies, associated with a given alarm condition. For example, if the compressor amperage is high, the system may suggest that technician check the capacitor voltage, check the refrigerant charge, and review the compressor for mechanical problems. Finally, the processed and associated data will be used to populate the data tables 308 that are discussed in further figures.

Figure 3:
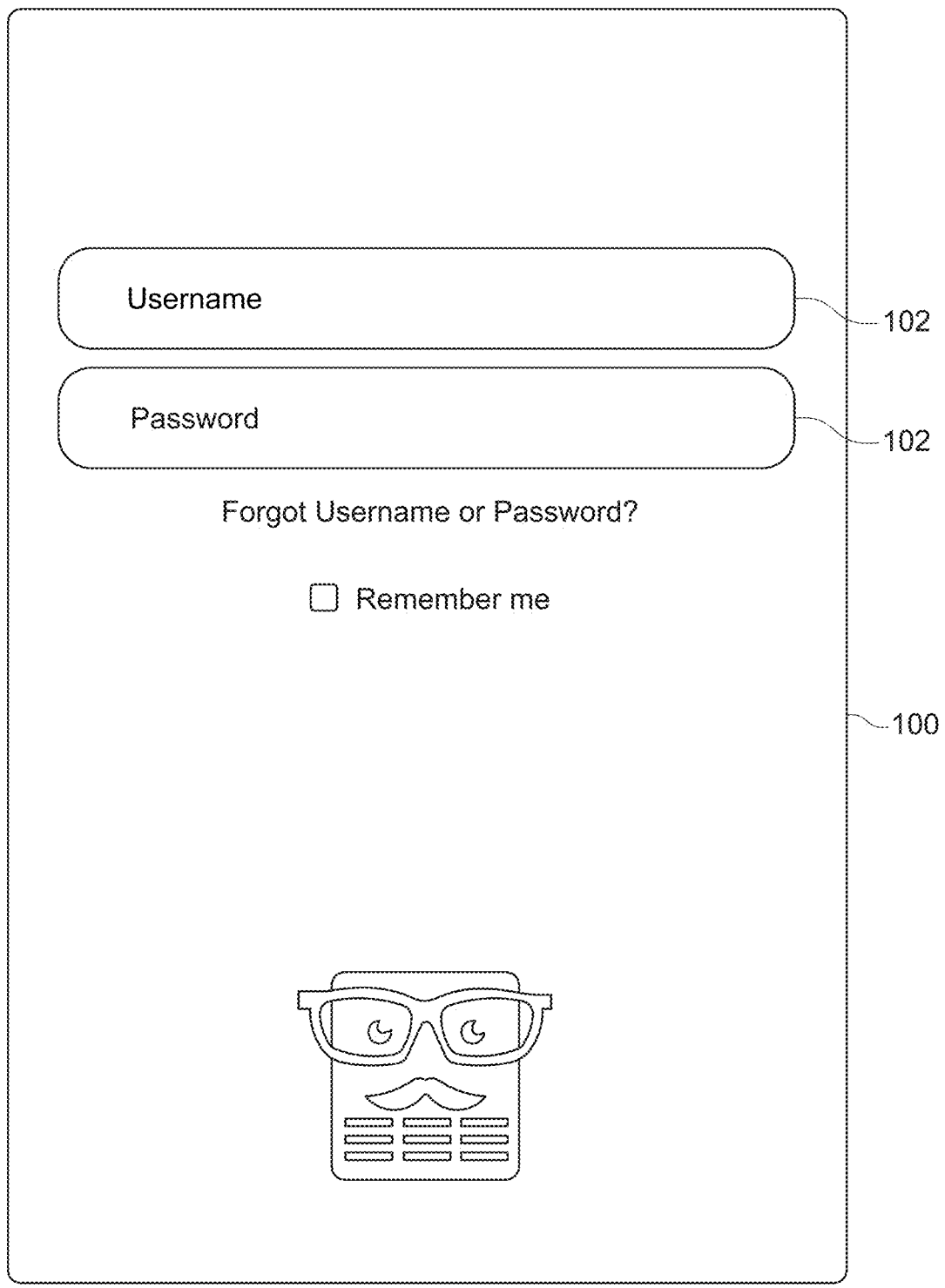
FIG. 3 illustrates a login screen of the system for HVAC diagnosis and optimization.

Referring to FIG. 3, a login screen of the system for HVAC diagnosis and optimization is shown.

The app interface 100 is shown with login fields 102.

Figure 4:
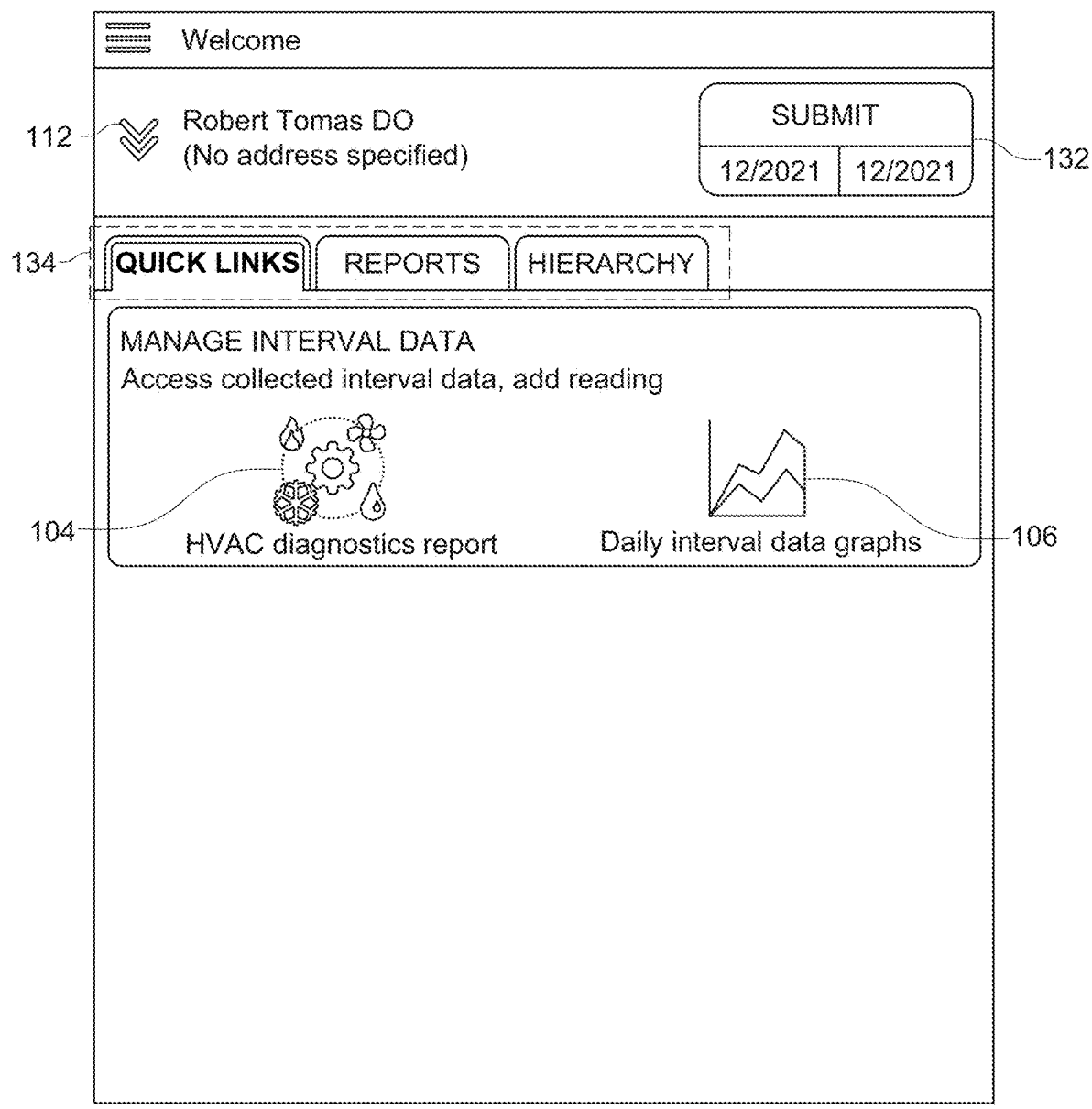
FIG. 4 illustrates a first selection screen of the system for HVAC diagnosis and optimization.

Referring to FIG. 4, a first selection screen of the system for HVAC diagnosis and optimization is shown.

After a user has logged in, the user can use the client selector 112 and date range selector 132 to focus in on the location and dates of interest.

A tabbed display type selector 134 allows the user to choose between quick links, which includes diagnostics 104 and graphs 106, and reports or hierarchy.

Figure 5:
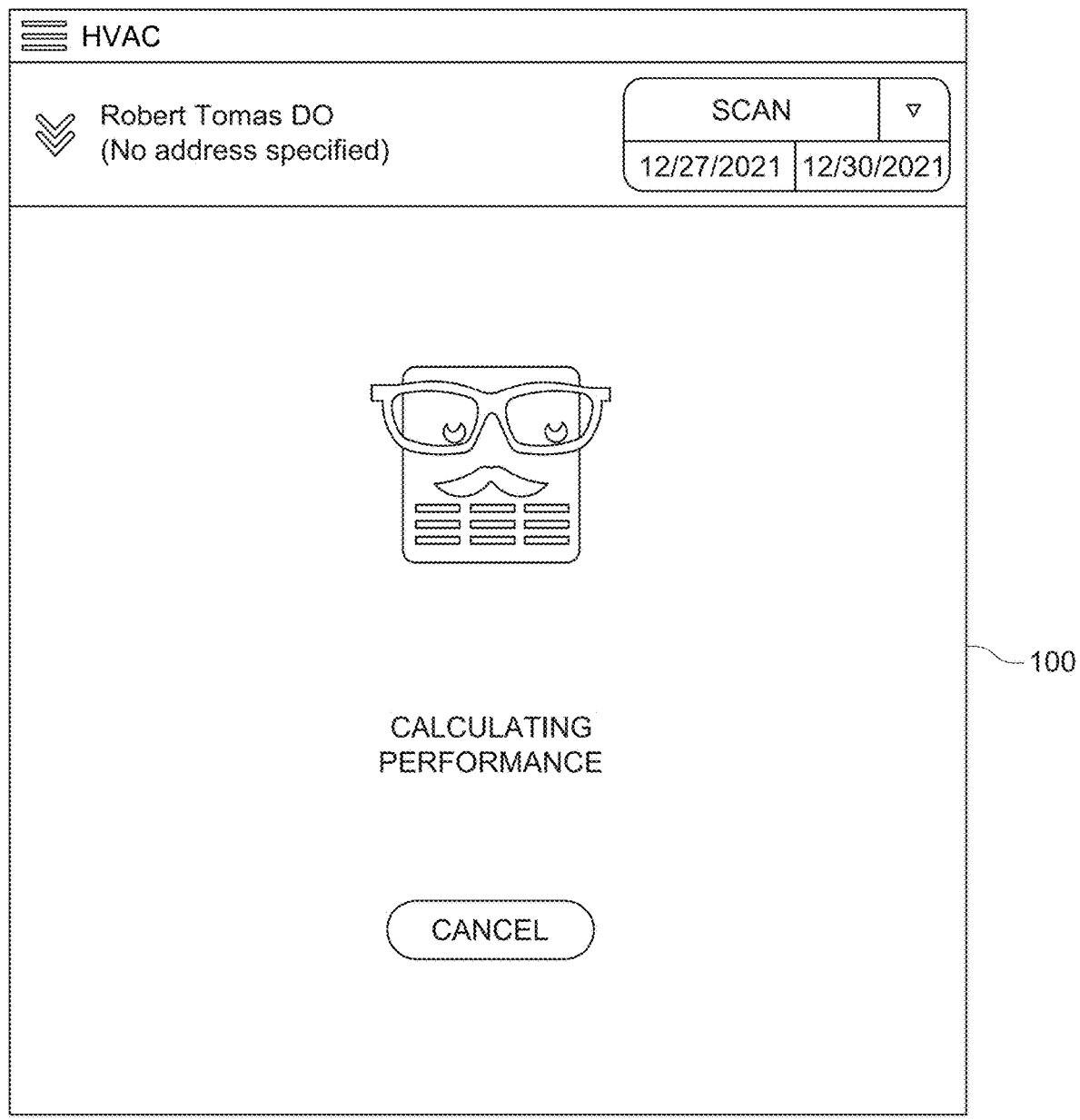
FIG. 5 illustrates a calculation screen of the system for HVAC diagnosis and optimization.

Referring to FIG. 5, a calculation screen of the system for HVAC diagnosis and optimization is shown.

Here the app interface 100 includes a moving graphic indicating the server is processing for the client, system, and date range selected.

Referring to FIG. 6, a system selection screen of the system for HVAC diagnosis and optimization is shown.

The system selector 108 includes the name of each system associated with the particular client. Further it includes, associated with the client names, a graphical alert summary 109 that includes graphics and numerical indicators associated with system conditions.

The graphical alert summary 109 allows a user to quickly determine the status of monitored systems, the quantity of alerts, and an air flow measurement. Airflow is the measurement most often indicating system problems, and thus the measurement most important to show on a summary screen.

Figure 7:
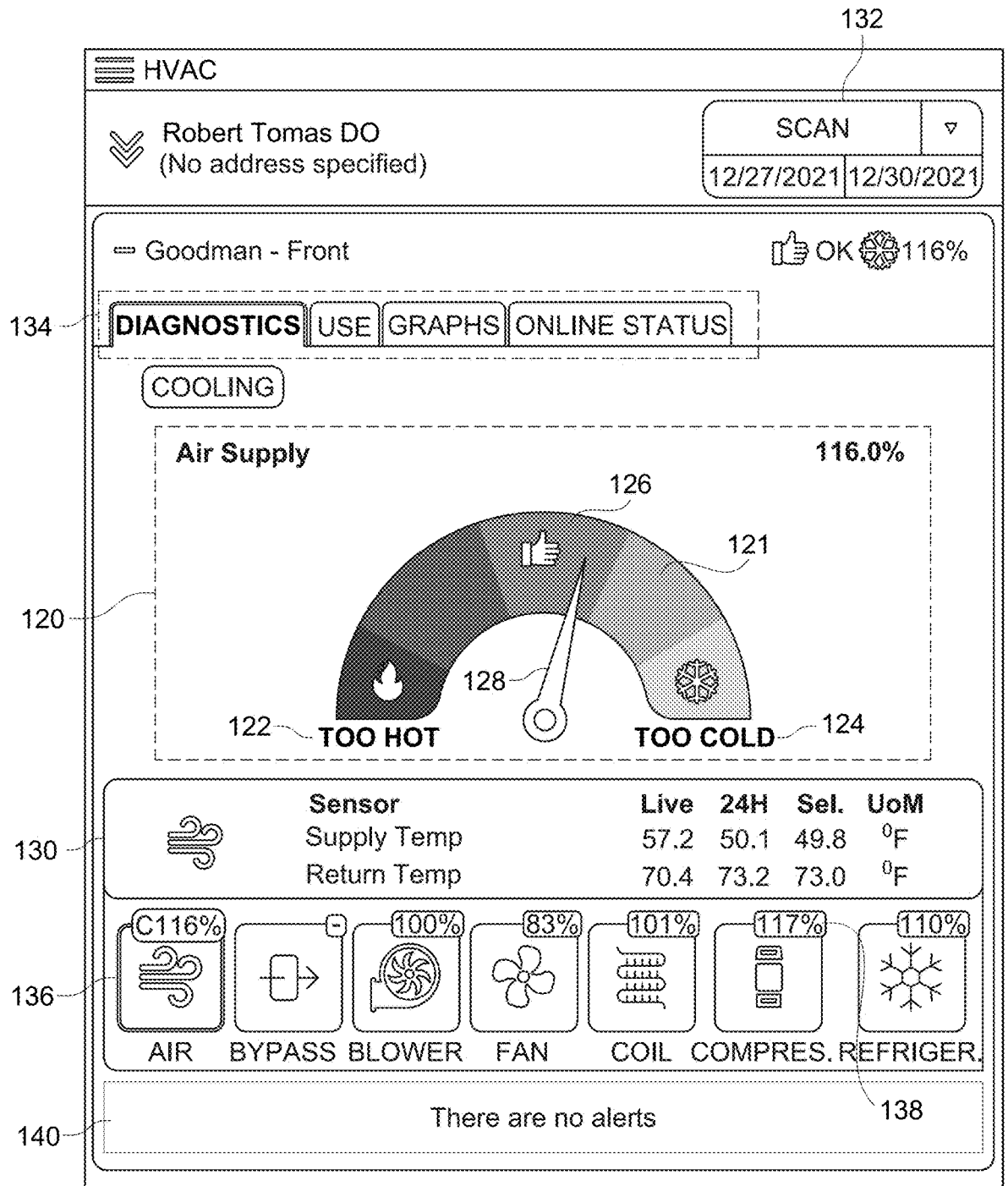
FIG. 7 illustrates a typical tuner view, here showing air flow, of the system for HVAC diagnosis and optimization.

Referring to FIG. 7, a typical tuner view, here showing air flow, of the system for HVAC diagnosis and optimization is shown.

The visual tuner 120 is a graphical methodology for presenting a summary of system information to allow the technician to readily identify recorded system conditions in light of optimal conditions specified by the original equipment manufacturer, or that are expected based on the equipment.

The visual tuner 120 includes a visual tuning dial 121 with a tuning element lower limit 122, a tuning element upper limit 124, and a tuning element optimal range 126.

A color-coded background helps the user to recognize values that are within range, as well as values above and below optimal range. For example, the tuning element lower limit 122 can be red, the tuning element upper limit 124 can be blue, and the tuning element optimal range 126 can be green. This allows the user to readily recognize readings that or too hot, too cold, and ideal.

A visual indicator of location in range 128, or indicator needle, allows the technician to quickly identify current system conditions as compared to optimal conditions.

If additional information is needed, the technician can reference condition summary 130. Here, because the air flow summary is selected, the condition summary 130 includes sensor data drawn from the supply temperature sensor and the return temperature sensor. Included is live, or current data, a 24-hour average, a selected value, and units of measurement.

Also shown is the date range selector 132 to allow the user to change the range of dates used for the underlying data.

The tabbed display type selector 134 allows the technician to switch to other representations of data associated with the same system. This is further addressed in FIGS. 15-18.

The component icons 136 are placed under the visual tuner 120 and condition summary 130, each component icon 136 including an associated component numerical summary 138. This allows the technician to quickly identify conditions associated with each subsystem further simplifying the process of diagnosing system issues.

At the bottom of the interface is alert section 140 The sample HVAC system has no alerts, thus there are no alerts displayed.

Figure 8:
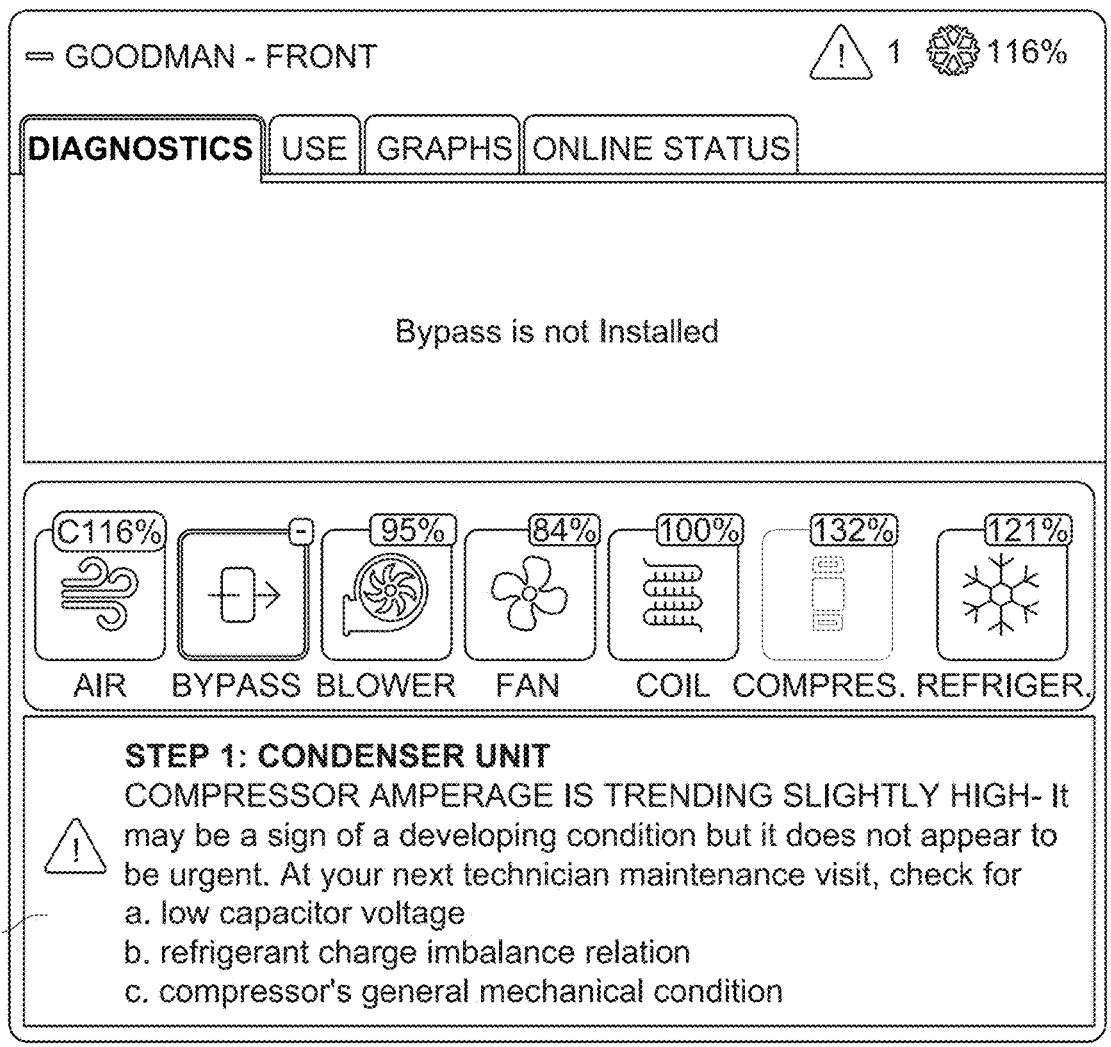
FIG. 8 illustrates a typical tuner view, here showing bypass, of the system for HVAC diagnosis and optimization.

Referring to FIG. 8, a typical tuner view, here showing bypass, of the system for HVAC diagnosis and optimization is shown.

For the example system shown in this figure there is no bypass. Thus, the interface states that a bypass is not installed.

Of note is the alert section 140, here indicating an alert, indicating that the compressor is operating outside of optimal range. This can also be seen by a color change of the associated component icon 136, and the compressor component numerical summary 138 showing 132%, or 32% above optimal operating parameters.

Figure 9:
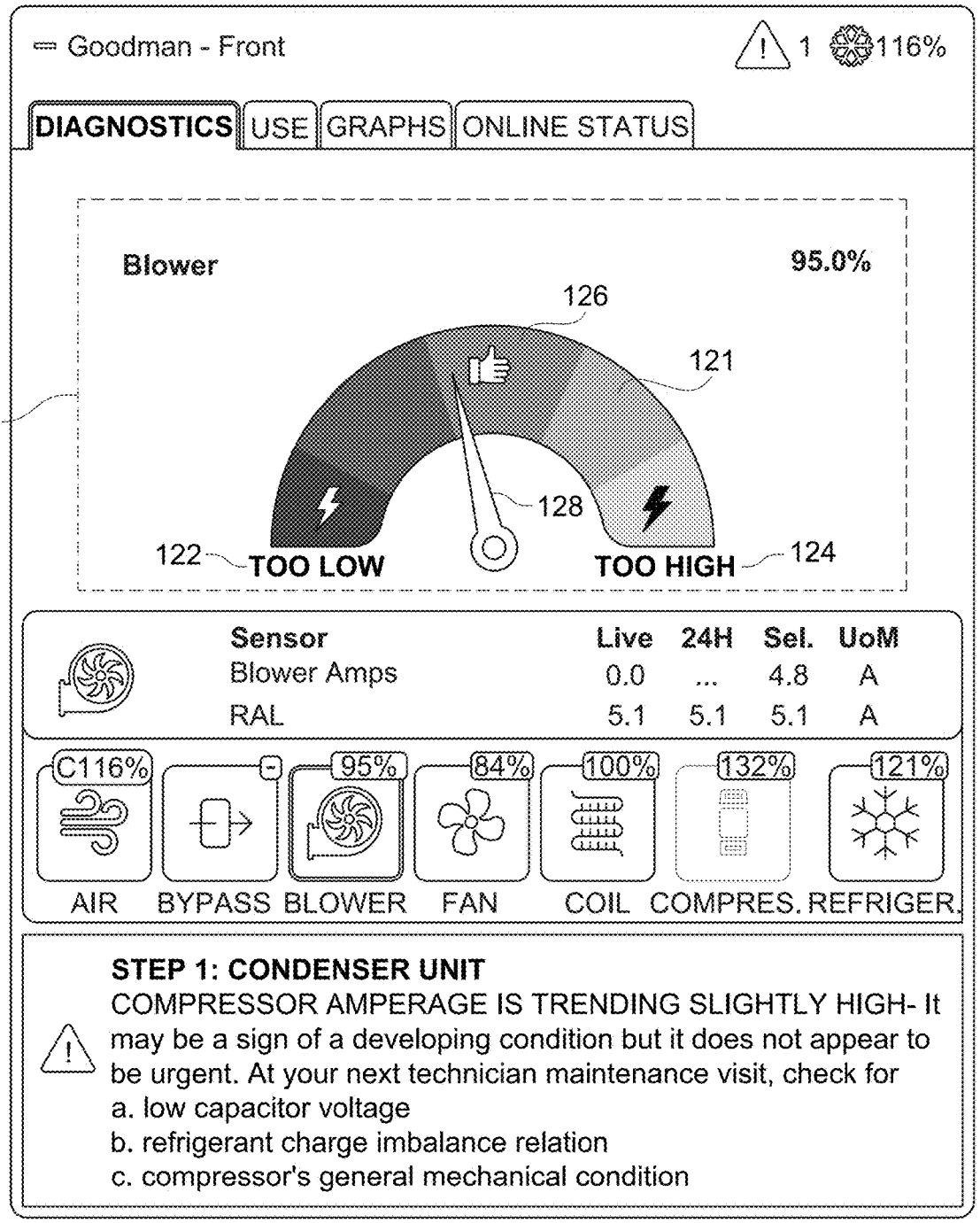
FIG. 9 illustrates a typical tuner view, here showing blower operation, of the system for HVAC diagnosis and optimization.

Referring to FIG. 9, a typical tuner view, here showing blower operation, of the system for HVAC diagnosis and optimization is shown.

In this screen, blower operation is shown. The visual tuner 120 again includes a visual tuning dial 121, tuning element lower limit 122, tuning element upper limit 124, tuning element optimal range 126, and a visual indicator of location in range 128.

Figure 10:
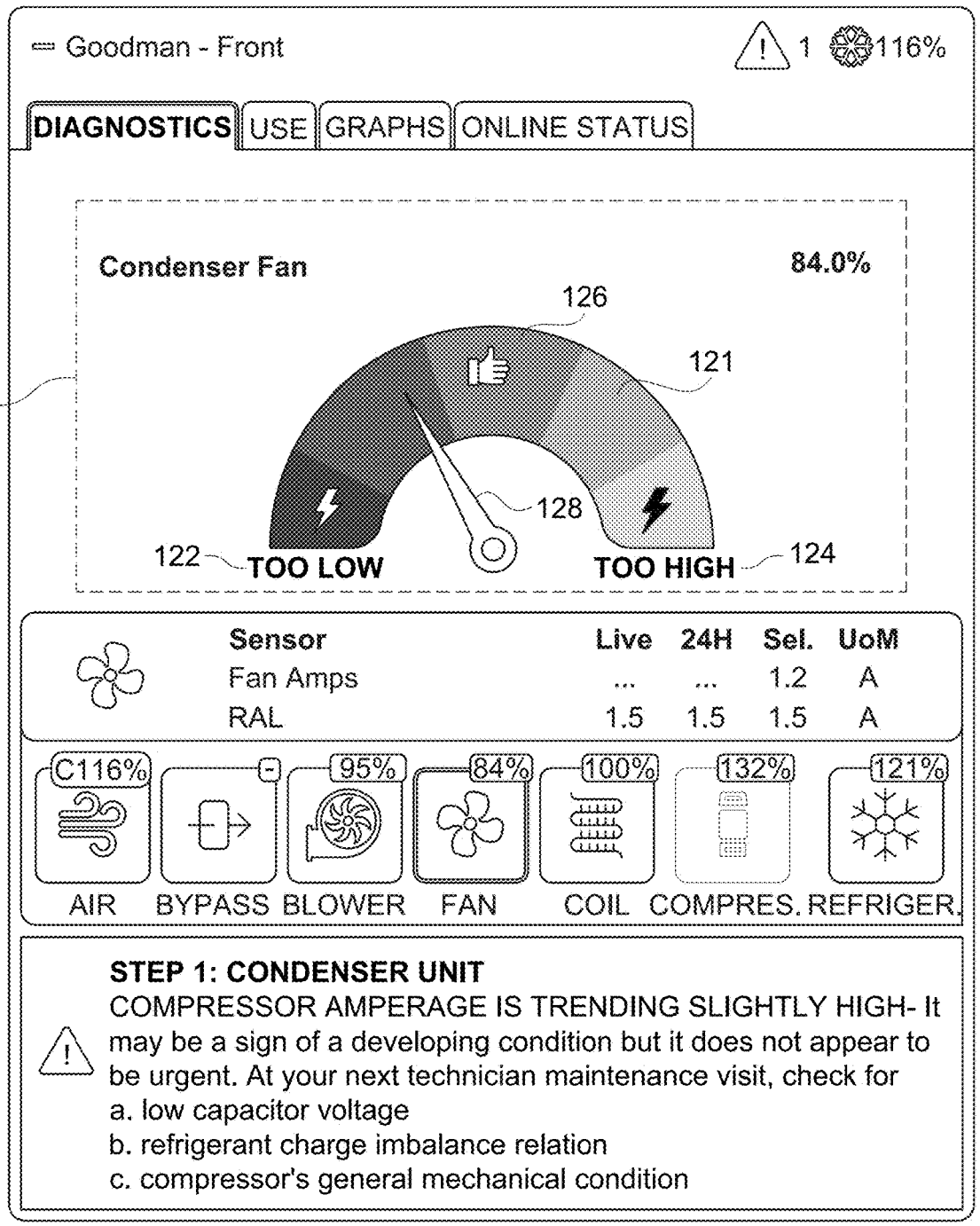
FIG. 10 illustrates a typical tuner view, here showing condenser fan operation, of the system for HVAC diagnosis and optimization.

Referring to FIG. 10, a typical tuner view, here showing condenser fan operation, of the system for HVAC diagnosis and optimization is shown.

In this view, condenser fan operation is shown.

The visual tuner 120 again includes a visual tuning dial 121, tuning element lower limit 122, tuning element upper limit 124, tuning element optimal range 126, and a visual indicator of location in range 128.

Figure 11:
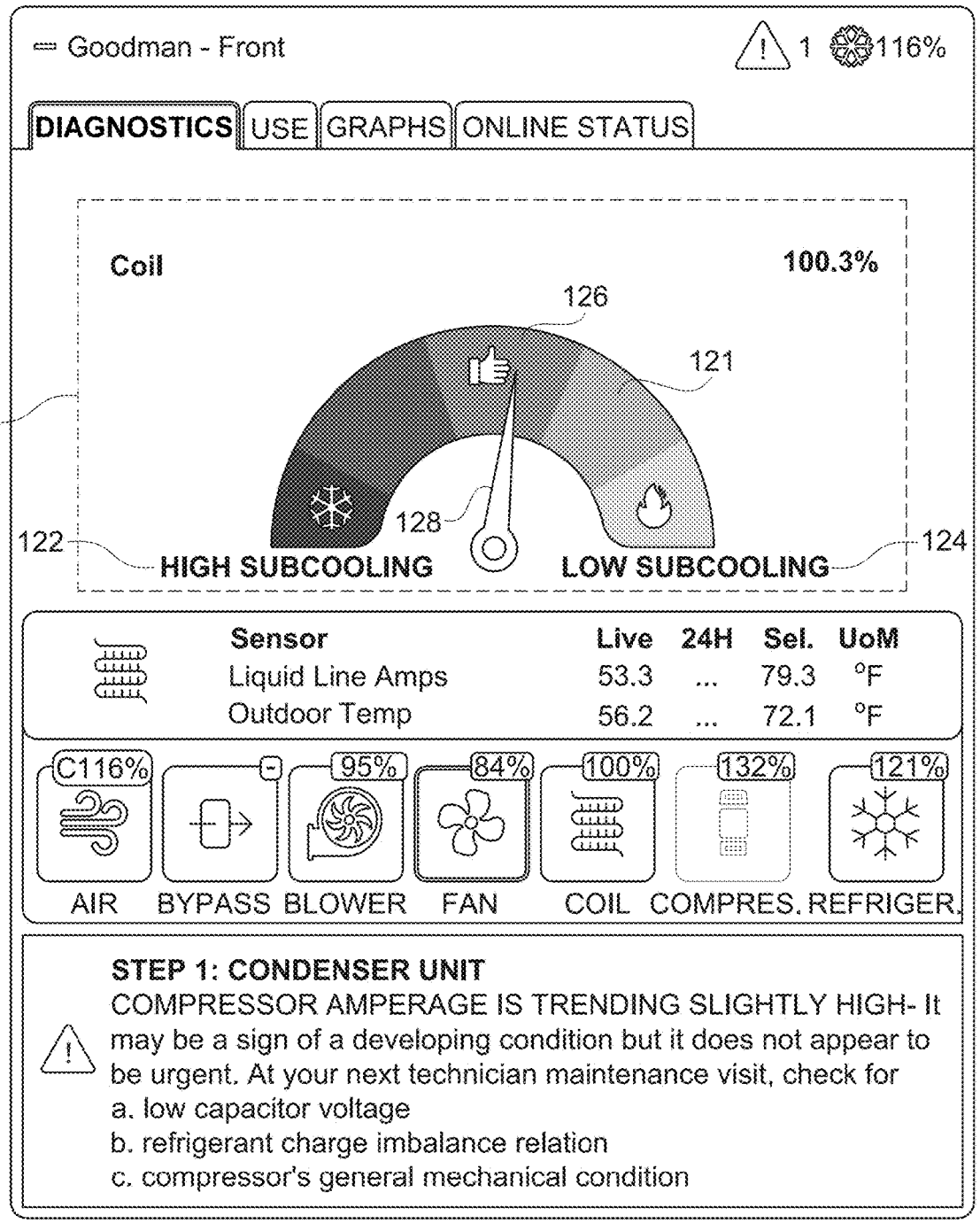
FIG. 11 illustrates a typical tuner review, here showing coil conditions, of the system for HVAC diagnosis and optimization.

Referring to FIG. 11, a typical tuner review, here showing coil conditions, of the system for HVAC diagnosis and optimization is shown.

In this view the coil conditions are shown. This includes the condition of the refrigerant and its associated level of subcooling. Also shown is the outdoor air temperature, which affects the refrigerant's ability to exchange heat.

The visual tuner 120 again includes a visual tuning dial 121, tuning element lower limit 122, tuning element upper limit 124, tuning element optimal range 126, and a visual indicator of location in range 128.

Figure 12:
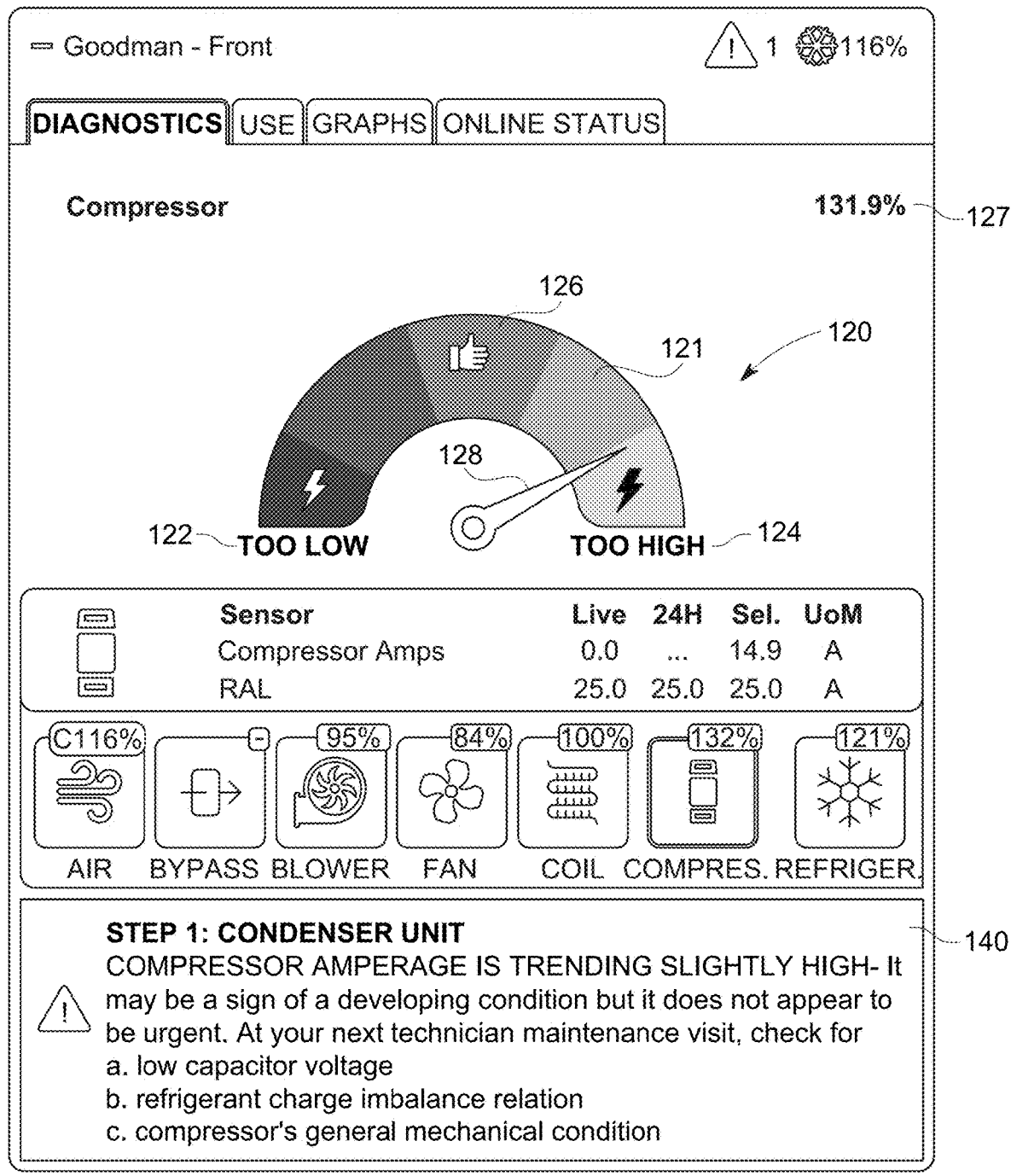
FIG. 12 illustrates a typical tuner view, here showing compressor conditions, of the system for HVAC diagnosis and optimization.

Referring to FIG. 12, a typical tuner view, here showing compressor conditions, of the system for HVAC diagnosis and optimization is shown.

The compressor is the system that in this example has an alert. The alert can be seen in the high percentage value displayed by the current indicator value 127 in the upper right of the visual tuner 120. The percentage value is the calculation of the measured value for a particular component, divided by its ideal value. For example, if the measured current consumption of the blower is 5 amps, and the ideal electrical current consumption is 4.5 amps, the percentage reading is 111%. This lets the user readily understand that the blower is consuming 11% more amps than the manufacturer suggests as its ideal operational value.

The use of percentages, rather than values with units of measurement, allows the technician to readily understand how well the component is operating.

Similarly, an average performance, or operational, value for each component can be calculated using data collected during periods of operation of the system. This average performance, or operational, value excludes periods of time during which the system is not operating. Instead, this average value is formed by calculating an average based on all measured values for a particular component during operation. For example, if the measured current consumption of a blower is 4 amps for one hour, 6 amps for a second hour, 0 amps for a third hour, the average value is 5 amps.

The visual indicator of location in range 128 also shows operation near the tuning element upper limit 124, above the tuning element optimal range 126, and well above the tuning element lower limit 122.

Also shown in the alert section 140 is a summary of the alert and suggestions for technician action.

Figure 13:
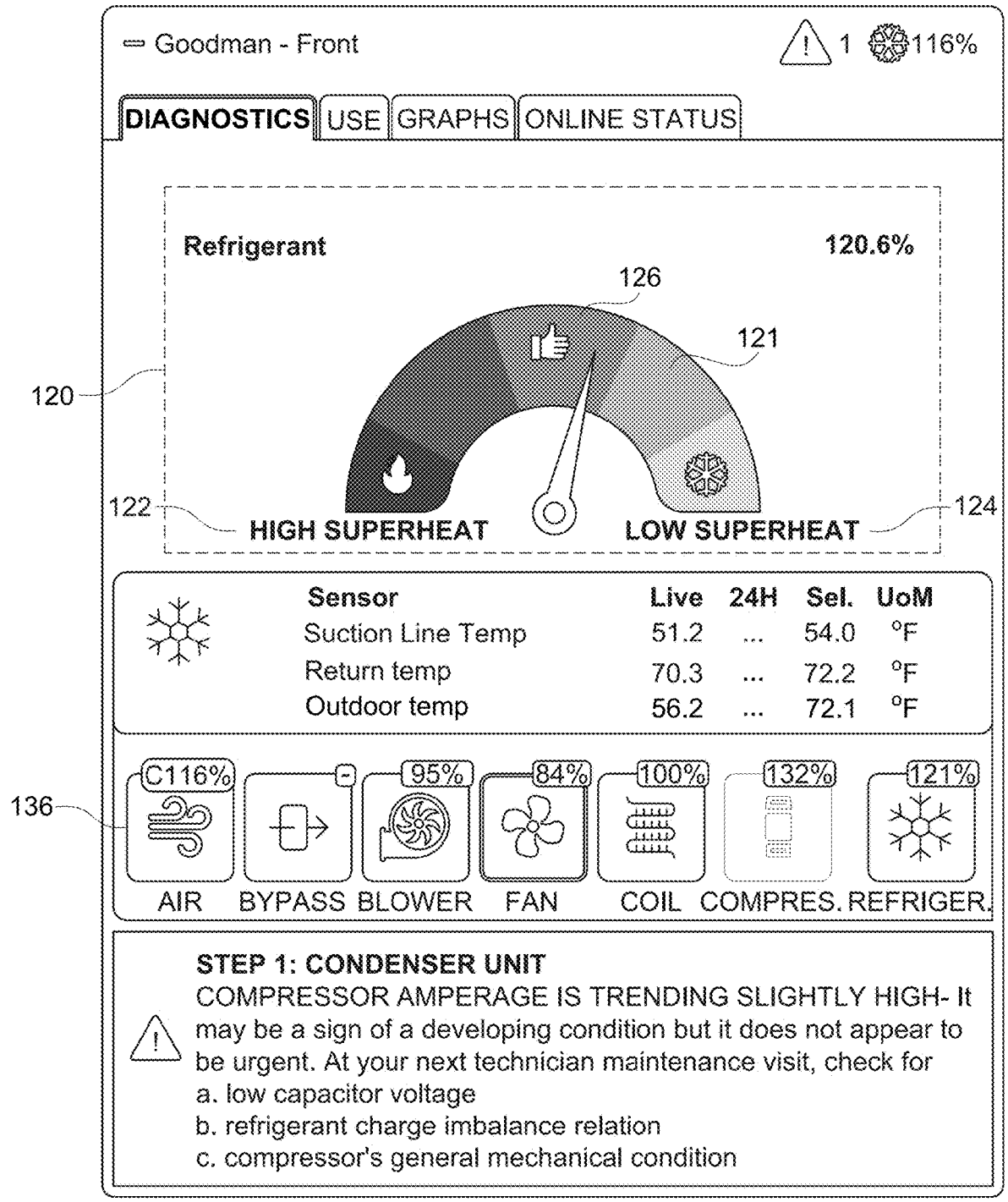
FIG. 13 illustrates a typical tuner view, here showing refrigerant conditions, of the system for HVAC diagnosis and optimization.

Referring to FIG. 13, a typical tuner view, here showing refrigerant conditions, of the system for HVAC diagnosis and optimization is shown.

Refrigerant conditions are shown in this figure. Refrigerant conditions are the least likely to help a technician locate an equipment malfunction, thus they are the last component shown in the array, or set, of component icons 136.

The visual tuner 120 again includes a visual tuning dial 121, tuning element lower limit 122, tuning element upper limit 124, tuning element optimal range 126, and a visual indicator of location in range 128.

Figure 14:
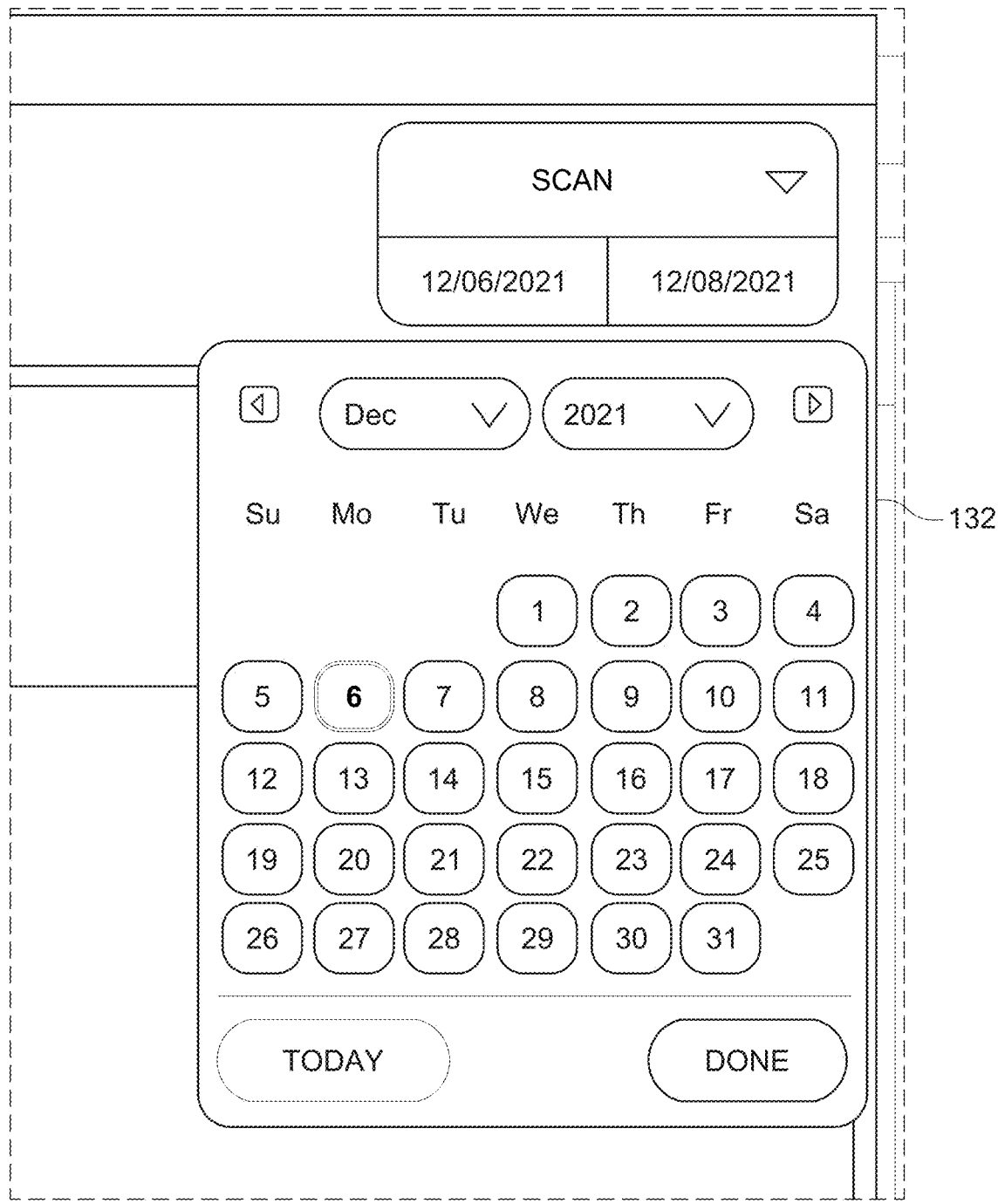
FIG. 14 illustrates a date range selector of the system for HVAC diagnosis and optimization.

Referring to FIG. 14, a date range selector of the system for HVAC diagnosis and optimization is shown.

The date range selector 132 is shown, allowing the technician to select a date or date range for review.

Figure 15:
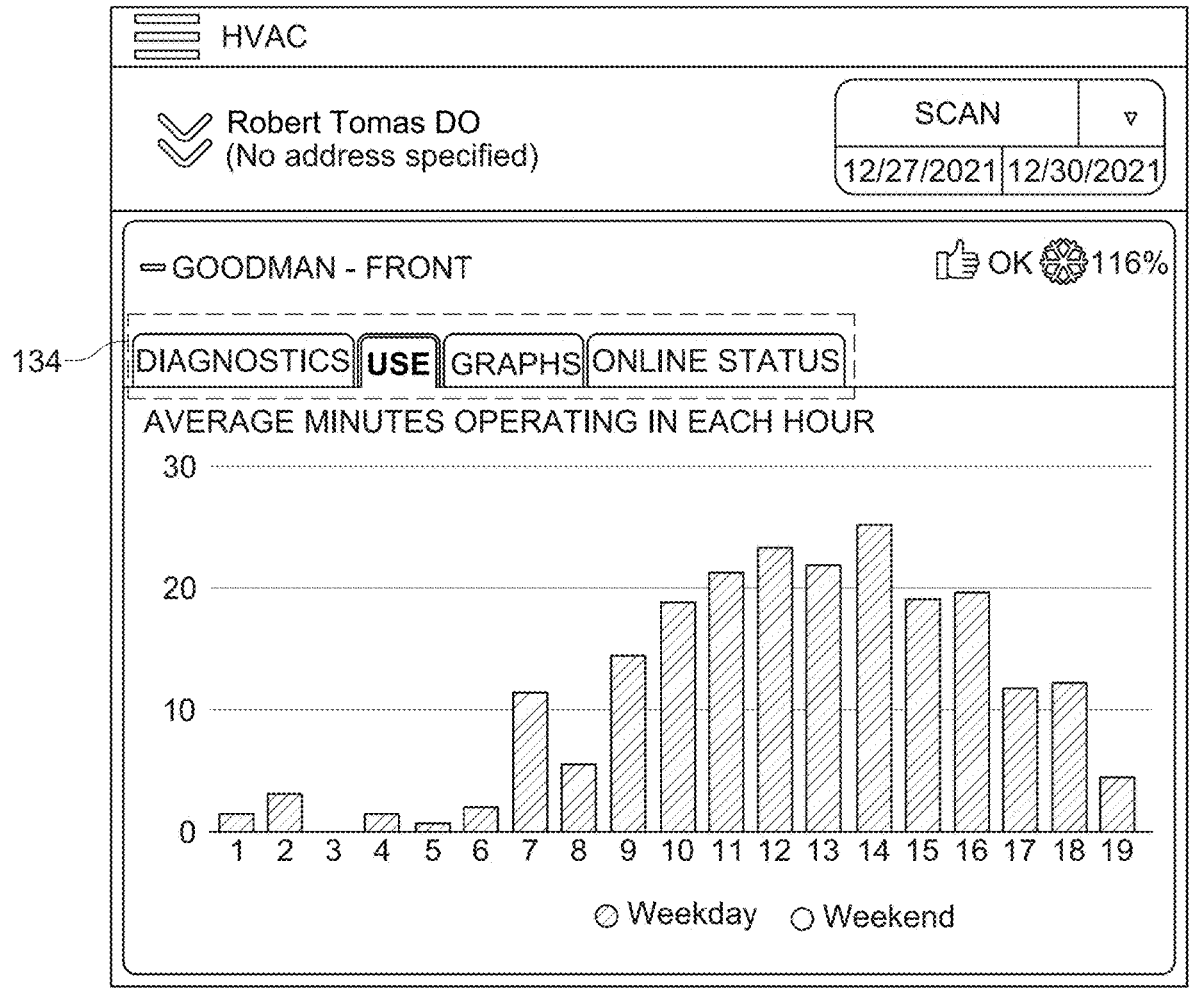
FIG. 15 illustrates a graphical representation of a chart showing use of the system for HVAC diagnosis and optimization.

Referring to FIG. 15, a graphical representation is shown of a chart showing use of the system for HVAC diagnosis and optimization.

As the user moves through the tabbed display type selector 134, aggregated data for the system is shown. For example, in the use tab, the average number of minutes per hour the system is running is shown.

Figure 16:
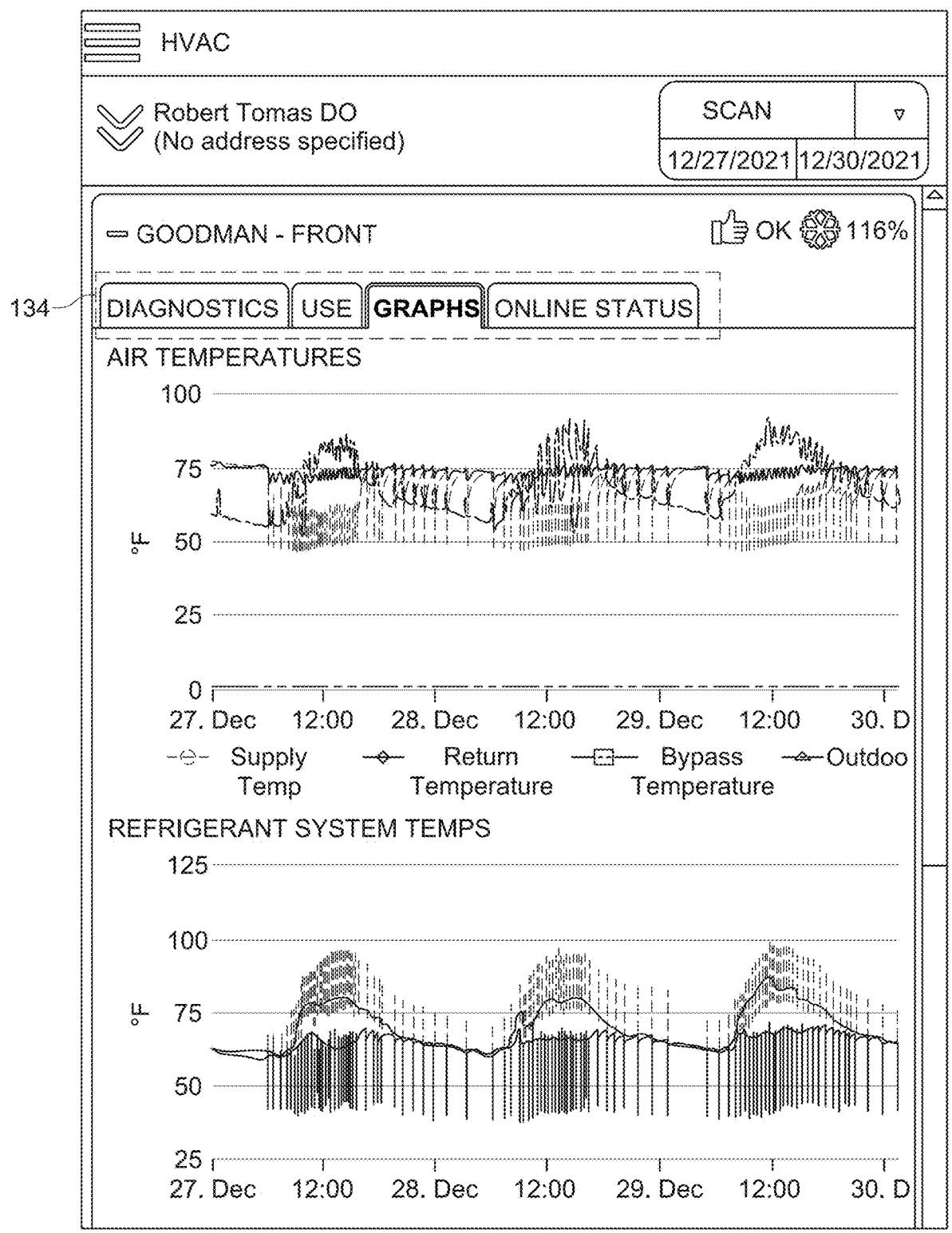
FIG. 16 illustrates a view of a detailed system graph showing multiple operating conditions of the system for HVAC diagnosis and optimization.
Figure 17:
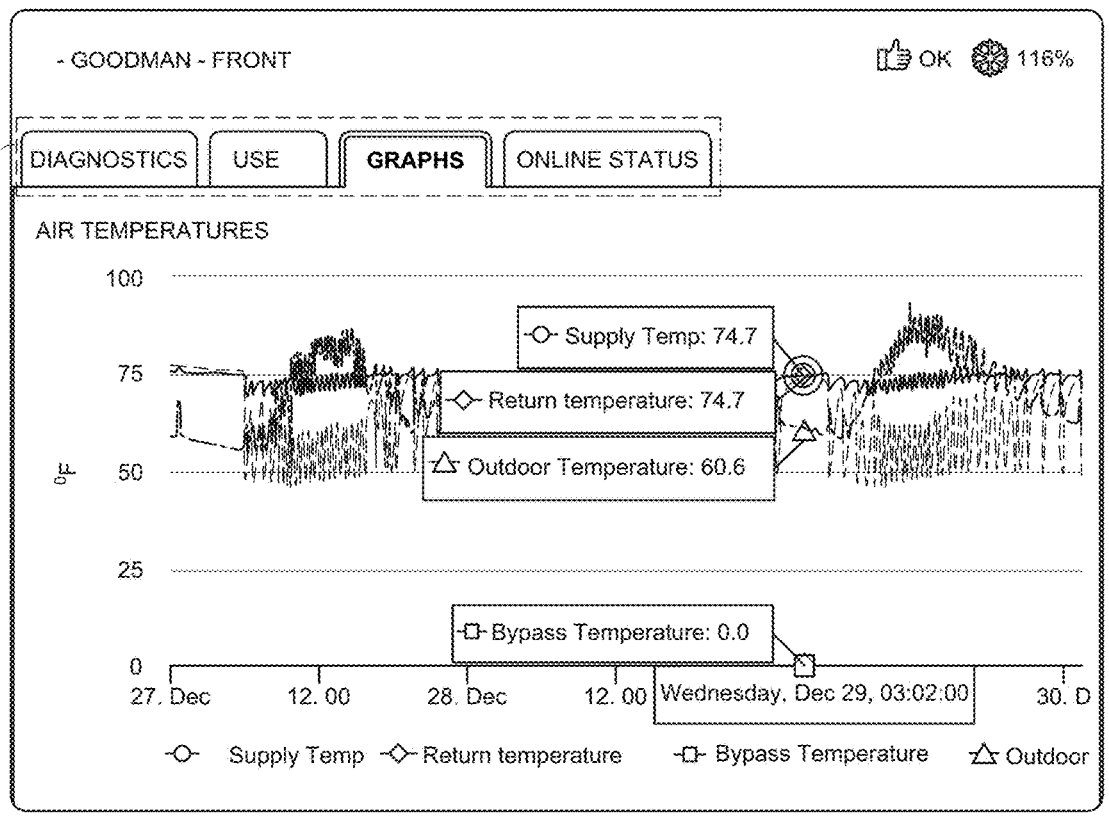
FIG. 17 illustrates a second view of a detailed system graph showing multiple operating conditions with cursor overlay of the system for HVAC diagnosis and optimization.

Referring to FIGS. 16 and 17, two views of a detailed system graph showing multiple operating conditions of the system for HVAC diagnosis and optimization are shown.

Here, in the graphs tab of the tabbed display type selector 134, graphs are shown overlaying multiple system measurements to aid a technician in a more sophisticated diagnosis.

Figure 18:
FIG. 18 illustrates a summary of current system conditions of the system for HVAC diagnosis and optimization.

As shown in FIG. 18, the technician can move over parts of the chart to display data measurements associated with that point in time.

In the online status tab of the tabbed display type selector 134, current system conditions are shown.

Figure 19:
FIG. 19 illustrates a client drop-down showing locations of equipment of the system for HVAC diagnosis and optimization.

Referring to FIG. 19, a client drop-down showing locations and equipment of the system for HVAC diagnosis and optimization is shown.

As an alternative means of filtering and sorting data, a nested outline is available.

Figure 20:
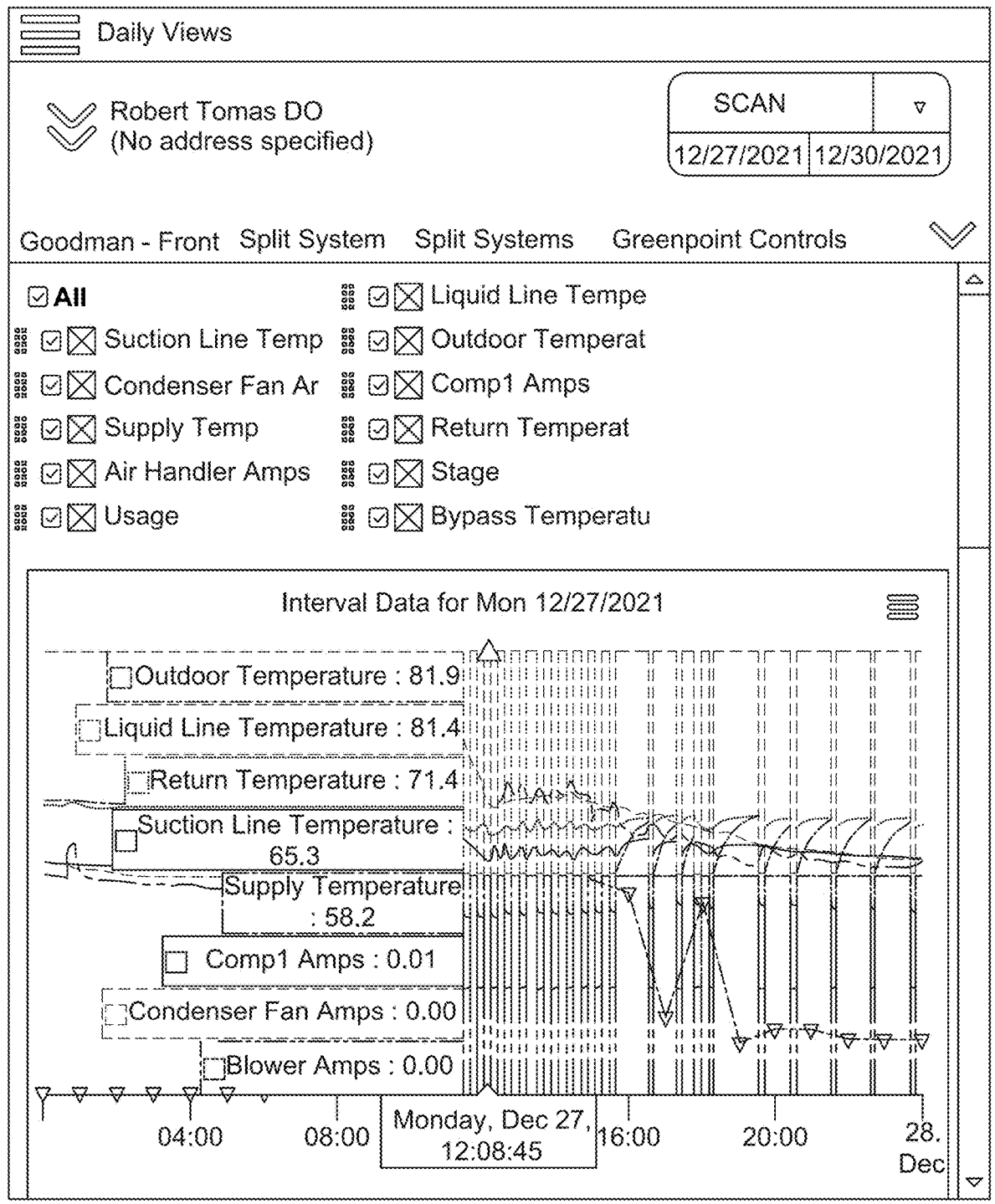
FIG. 20 illustrates an additional view with the option of toggling on and off certain system conditions.

Referring to FIG. 20, an additional view with the option of toggling on and off certain system conditions of the system for HVAC diagnosis and optimization is shown.

For a technician who is looking for a detailed summary of operating conditions, with the ability to toggle on and off particular measurements, there is a master visual graph with overlayed condition measurements.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely an exemplary and explanatory embodiment thereof. It is the intention of the following claims to encompass and include such changes.

What is claimed is:

1. A non-transitory computer-readable storage medium having stored thereon computer-executable instructions, which when executed by a computer, cause the computer to execute operations, the operations comprising:

receiving diagnostic data from a server, wherein the diagnostic data is associated with a heating ventilation and air conditioning (HVAC) system;

categorizing the received diagnostic data into a plurality of HVAC diagnostic categories including at least one of: an air temperature category, a bypass flow category, a blower operation, fan speed category, a coil temperature category, a compressor status category, or a refrigerant pressure category;

organizing the categorized diagnostic data based on an order of HVAC diagnostic category that is most likely to cause abnormal system function to the HVAC system among the plurality of HVAC diagnostic categories;

controlling a display device to display a visual color-coded user interface that includes the diagnostic data in association with a color-coded scale to generate a visual tuner, the visual tuner to aid in visual recognition of whether the diagnostic data is within a preferred operating range;

calculating an average operational value for each of the plurality of HVAC diagnostic categories;

calculating a component numerical summary as a percentage value for each of the plurality of HVAC diagnostic categories, based on the calculated average operational value for a respective HVAC diagnostic category of the plurality of HVAC diagnostic categories and respective preferred manufacturer data of multiple manufacturer data for each of the plurality of HVAC diagnostic categories;

controlling the display device to display an icon of each of the plurality of HVAC diagnostic categories;

controlling the display device to display the calculated component numerical summary for each of the plurality of HVAC diagnostic categories adjacent to the displayed icon of the respective HVAC diagnostic category, wherein the displayed component numerical summary represents average performance data for the respective HVAC diagnostic category;

controlling the display device to display summarized component operational conditions of the HVAC system based on the display of the calculated component numerical summary and the icon.

2. The non-transitory computer-readable storage medium of claim 1 wherein the operations further comprising controlling the display device to display the diagnostic data in an order of: the air temperature category, the bypass flow category, the blower operation category, the fan speed category, the coil temperature category, the compressor status category, and the refrigerant pressure category.

3. The non-transitory computer-readable storage medium of claim 1, wherein the operations further comprising:

determining that at least one HVAC diagnostic category of the plurality of HVAC diagnostic categories is out of preferred manufacturer data, based on comparison of a performance value of the at least one HVAC diagnostic category to a manufacturer data set of ideal values for the at least one HVAC diagnostic category; and controlling the display device to display an alert message based on the determination.

4. The non-transitory computer-readable storage medium of claim 1, wherein the operations further comprising:

determine that an alert message for at least one HVAC diagnostic category of the plurality of HVAC diagnostic categories is displayed;

correlating the displayed alert message with a database of suggested remedies; and controlling the display device to display a suggested remedy from the database of the suggested remedies with the displayed alert message, based on the correlation of the alert message with the database of suggested remedies.

5. The non-transitory computer-readable storage medium of claim 1, wherein the operations further comprising filtering the plurality of HVAC diagnostic categories to fit a particular time period based on a user selection.

6. An information processing method for diagnosis and tuning of mechanical equipment, the method comprising the steps of:

separating heating ventilation and air conditioning (HVAC) equipment performance data into a plurality of component data sets, wherein each component data set of the plurality of component data sets indicates performance of a respective component of a plurality of components of a HVAC system;

sorting a plurality of manufacturer data sets to separate the plurality of manufacturer data sets based on the plurality of component data sets, wherein each manufacturer data set of the plurality of manufacturer data sets is associated with a respective component data set of the plurality of component data sets, and wherein each manufacturer data set of the plurality of manufacturer data sets includes preferred manufacturer data for the respective component;

correlating a specific component data set of the plurality of component data sets with a specific manufacturer data set of the plurality of manufacturer data sets, wherein the specific component data set is associated with the specific manufacturer data set, wherein the specific component data set indicates performance of a specific component of the plurality of components of the HVAC system, and wherein the specific manufacturer data set includes specific preferred manufacturer data for the specific component;

generating a visual tuner based on the correlation of the specific component data set and the specific manufacturer data set, wherein the generated visual tuner includes:

a range bounded by a minimum value of the specific manufacturer data set and a maximum value of the specific manufacturer data set, wherein the range includes a preferred range of the specific preferred manufacturer data;

a color-coded background in the range to aid in visual recognition of values outside of the preferred range of the specific preferred manufacturer data;

controlling a display device to display the generated visual tuner, wherein the displayed visual tuner indicates whether the value of the performance of the specific component of the HVAC system lies within the preferred range of the preferred manufacturer data.

7. The information processing method of claim 6, wherein:

the visual tuner further comprises:

an indicator needle that represents a value of the performance of the specific component within the range;

the visual tuner populated with the indicator needle.

8. The information processing method of claim 6, further comprising:

calculating an average operational value for the specific component based on the specific component data set;

calculating a specific component numerical summary as a percentage value for the specific component based on the calculated average operational value for the specific component and the preferred manufacturer data for the specific component, wherein the percentage value for the specific component indicates whether the specific component is operating within its preferred operating range;

controlling the display device to display a specific icon representing the specific component of the HVAC system; and controlling the display device to display the calculated specific component numerical summary adjacent to the displayed specific icon.

9. The information processing method of claim 8, further comprising:

determining that the specific component data set for the specific component is out of the specific preferred manufacturer data based on comparison of the specific manufacturer data set and the specific component data set; and controlling the display device to display an alert message based on the determination.

10. The information processing method of claim 9, further comprising:

correlating the alert message with a database of suggested remedies based on the display of the alert message; and controlling the display device to display at least one suggested remedy from the database of suggested remedies with the displayed alert message, based on the correlation of the alert message with the database of suggested remedies.

11. The information processing method of claim 8, further comprising filtering the HVAC equipment performance data to fit a particular time period based on a user selection.

\* \* \* \* \*